United States Patent
Deruyter et al.

(10) Patent No.: US 12,495,732 B2
(45) Date of Patent: Dec. 16, 2025

(54) ADJUSTABLE SPREADER SYSTEM FOR AN AGRICULTURAL HARVESTER

(71) Applicant: CNH Industrial America LLC, New Holland, PA (US)

(72) Inventors: Lucas Deruyter, Hooglede-Gits (BE); Dré W.J. Jongmans, AG Klundert (BE); Arno Leenknegt, Hooglede (BE); Bart M.A. Missotten, Herent (BE); Sam Reubens, Sint-Michiels (BE); Frederik Tallir, Esen (BE)

(73) Assignee: CNH Industrial America LLC, New Holland, PA (US)

(*) Notice: Subject to any disclaimer, the term of this patent is extended or adjusted under 35 U.S.C. 154(b) by 592 days.

(21) Appl. No.: 17/979,455

(22) Filed: Nov. 2, 2022

(65) Prior Publication Data

US 2023/0139286 A1    May 4, 2023

(30) Foreign Application Priority Data

Nov. 2, 2021 (EP) .................................. 21206084

(51) Int. Cl.
*A01F 29/12* (2006.01)
*A01D 41/12* (2006.01)
*A01D 41/127* (2006.01)

(52) U.S. Cl.
CPC ..... *A01D 41/1243* (2013.01); *A01D 41/1271* (2013.01); *A01F 29/12* (2013.01)

(58) Field of Classification Search
CPC ..... A01F 29/01; A01F 29/12; A01D 41/1243; A01D 41/1271
See application file for complete search history.

(56) References Cited

U.S. PATENT DOCUMENTS 8,010,262 B2* 8/2011 Schroeder .......... A01D 41/1243
701/50
8,118,650 B2* 2/2012 Isaac .................. A01D 41/1243
460/111

(Continued)

FOREIGN PATENT DOCUMENTS

EP    2521434 B1    4/2014
EP    3106015 A1 * 12/2016 ......... A01D 41/1243

(Continued)

OTHER PUBLICATIONS

Extended European Search Report for EP Application No. 21206084.2 dated May 16, 2022 (6 pages).

*Primary Examiner* — Adam J Behrens
(74) *Attorney, Agent, or Firm* — Buchanan Ingersoll & Rooney PC (57) ABSTRACT

A spreader system includes two spreader rotors configured to rotate about upright rotation axes and to eject residue crop material centrally between the rotors in a direction tangential to the rotors. The spreader system further includes a first structure that is configured to undergo an oscillating movement, such as a rotating oscillation about a central axis oriented in the tangential direction. The spreader system further includes adjustable deflector blades. The first structure can be a main deflector having main deflector blades, wherein the adjustable deflector blades are parallel to the main deflector blades and adjustable by a translation relative to the main deflector blades in an upward or downward direction, to thereby influence a gap between the main deflector and a lower plane of the rotors. The adjustable blades may be each pivotable relative to a frame so that their angular position can be set to one of several positions.

16 Claims, 7 Drawing Sheets

(56) References Cited

U.S. PATENT DOCUMENTS

| | | | |
|---|---|---|---|
| 10,143,131 B2* | 12/2018 | Isaac | A01D 41/127 |
| 10,694,667 B2* | 6/2020 | Reinecke | A01D 41/1243 |
| 2009/0111548 A1* | 4/2009 | Landuyt | A01D 41/1243 |
| | | | 460/112 |
| 2010/0291985 A1* | 11/2010 | Pohlmann | A01D 41/1243 |
| | | | 460/112 |
| 2011/0045883 A1* | 2/2011 | Weichholdt | A01D 41/1243 |
| | | | 460/112 |
| 2011/0237316 A1* | 9/2011 | Isaac | A01D 41/1243 |
| | | | 460/111 |
| 2013/0095899 A1 | 4/2013 | Knapp | |
| 2014/0031096 A1* | 1/2014 | Isaac | A01D 41/1243 |
| | | | 460/111 |
| 2014/0302897 A1* | 10/2014 | Isaac | A01D 41/127 |
| | | | 460/111 |
| 2016/0316623 A1* | 11/2016 | Reinecke | A01D 41/1243 |
| 2017/0094903 A1* | 4/2017 | Baes | A01F 12/48 |
| 2017/0112055 A1* | 4/2017 | Depreitere | A01D 41/127 |
| 2017/0142900 A1* | 5/2017 | Mahieu | A01D 41/1243 |
| 2019/0084764 A1* | 3/2019 | Dilts | B65G 11/126 |
| 2019/0269071 A1* | 9/2019 | Dilts | A01D 41/1243 |
| 2020/0008352 A1* | 1/2020 | Mahieu | A01C 17/008 |
| 2020/0120869 A1* | 4/2020 | Vandike | H04N 23/90 |
| 2021/0127573 A1* | 5/2021 | Mahieu | A01D 41/1243 |
| 2022/0369552 A1* | 11/2022 | Christiansen | A01D 41/127 |

FOREIGN PATENT DOCUMENTS

| | | | | |
|---|---|---|---|---|
| EP | 3108738 A1 * | 12/2016 | | A01D 41/1243 |
| EP | 3592129 B1 | 6/2021 | | |
| WO | WO-2018162680 A1 * | 9/2018 | | A01D 41/1243 |

* cited by examiner

ADJUSTABLE SPREADER SYSTEM FOR AN AGRICULTURAL HARVESTER

FIELD OF THE INVENTION

The present invention is related to agricultural harvesters, such as combine harvesters, and, more specifically to crop residue spreader systems included in such combine harvesters.

STATE OF THE ART

An agricultural harvester known as a "combine" is historically termed such because it combines multiple harvesting functions within a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During the process of harvesting in a combine, the desired grain is gathered and saved while crop material other than the desired grain is expelled from the combine. The non-grain crop material or crop residue is usually derived from two areas in the combine, the threshing rotor and the cleaning system. The material expelled from the threshing rotor is generally referred to as straw and includes much of the larger plant material such as stalks, stems, cobbs, leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited onto the harvested crop stubble in a continuous narrow stream or windrow, which is much narrower than the harvested swath width. Accumulated in this manner, the windrowed residue material can be picked up easily for baling or other subsequent processing or use.

In a spreading process, a mechanical device distributes the straw and/or chaff evenly across the extent of the combine header cutting width. The material to be spread is usually chopped to a short length so that after spreading the material will break down quickly to add nutrients to the soil and/or to be sufficiently small so as to not interfere with subsequent tilling or seeding operations.

Residue spreaders can be of horizontal and vertical types. A horizontal spreader includes a spreader rotor driven on a generally vertical axis and a plurality of vanes or paddles on the spreader rotor to propel residue in a wide swath behind the combine. Commonly, two such side-by-side spreader rotors are used, the spreader rotors rotating in opposite directions within a housing. After being chopped, the crop residue enters the spreader rotor area through a vertical inlet in the spreader housing, and as the paddles rotate about the axis the residue is propelled towards a tangential outlet of the housing. Typically, the spreader system comprises a stationary deflector whose orientation and shape determines the spread pattern of the crop residue. It is desirable to achieve an even distribution of material for more even and consistent residue material breakdown and to facilitate subsequent field tilling and seeding operations.

As combine harvesters increase in size and crop processing capability, the width of the header of the combine can increase in order to make fewer passes in a field. As the width of the header increases, so too must the spread width of crop residue behind the combine in order to uniformly cover the field which now is mostly bare of crops. The spread width can be adjusted, for example, by increasing the rotational speed of the spreader rotors and paddles so the crop material is spread a greater distance from the spreader system. The positioning of the deflector is controlled to prevent, for example, crop residue being spread onto standing crop, which would then be collected and reprocessed by the combine.

One particular problem that arises with greater spread widths is the creation of "stripes" of high and low volumes of crop residue along the driving direction of the combine in hard crop conditions. The stripes of high and low crop residue volumes are areas of uneven thickness of the crop residue, with higher thickness of the crop residue resulting in a high-volume stripe and lower thickness of the crop residue resulting in a low volume stripe. The stripes of crop residue distribution can lead to some areas of the field being practically bare of crop residue, with little added nutrients from the residue, while other areas of the field have excess crop residue that can interfere with seeding and tilling.

One way of remedying the problem of uneven residue spreading is to provide a horizontal spreader with two spreader rotors and provided with an oscillating deflector, as described for example in patent publication document WO2018/162680A1. A preferred embodiment described in the cited document is related to a deflector comprising two curved deflector blades, arranged in conjunction with the respective spreader rotors, wherein the deflector is subjected to an angular oscillation by rotating the deflector back and forth about a central horizontal axis. The blades are thereby moved up and down relative to the ejected crop residue, imparting an additional impulse to said residue which improves the evenness of the spreading pattern.

Nevertheless, uneven spreading can still be a problem even when such oscillating spreading systems are used. One problem in particular in relation to the above-described oscillation of the deflector blades about a horizontal axis, is that the oscillation has little or no influence on the central area of the deflector, given that the oscillation generates the smallest angular displacement in this area.

SUMMARY OF THE INVENTION

The invention is related to a spreader system for a self-propelled harvester and to a harvester provided with said system, as described in the appended claims. The spreader system of the invention comprises two spreader rotors configured to rotate about upright rotation axes and to eject residue crop material centrally between the spreader rotors in a direction tangential to said spreader rotors, and a first structure that is configured to undergo an oscillating movement, such as a rotating oscillation about a central axis oriented in said tangential direction. The spreader system further comprises adjustable deflector blades. The blades are adjustable in the sense that they are movable to any one of a plurality of stationary positions relative to the first structure. The first structure can be a main deflector having main deflector blades, wherein the adjustable deflector blades are parallel to said main blades and adjustable by a translation relative to said main deflector blades in an upward or downward direction, to thereby influence a gap between the main deflector and the lower plane of the spreader rotors. According to another embodiment, the adjustable blades are each pivotable relative to the first structure so that their angular position relative to said structure can be set to any one of several positions.

The invention enables the adjustment of the spreading behaviour of an oscillating spreader system, such as the control of the dimensions of a central opening through which crop residue is ejected without being deflected.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

The terms "grain", "straw" and "tailings" are used principally throughout this specification for convenience but it is to be understood that these terms are not intended to be limiting. Thus, "grain" refers to that part of the crop material that is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms 'vertical' and 'horizontal' are not intended to be limited to the geometrically precise directions relative to the earth's surface but are intended to refer respectively to a generally upright direction and to a direction that is more or less perpendicular to said upright direction.

Figure 1:
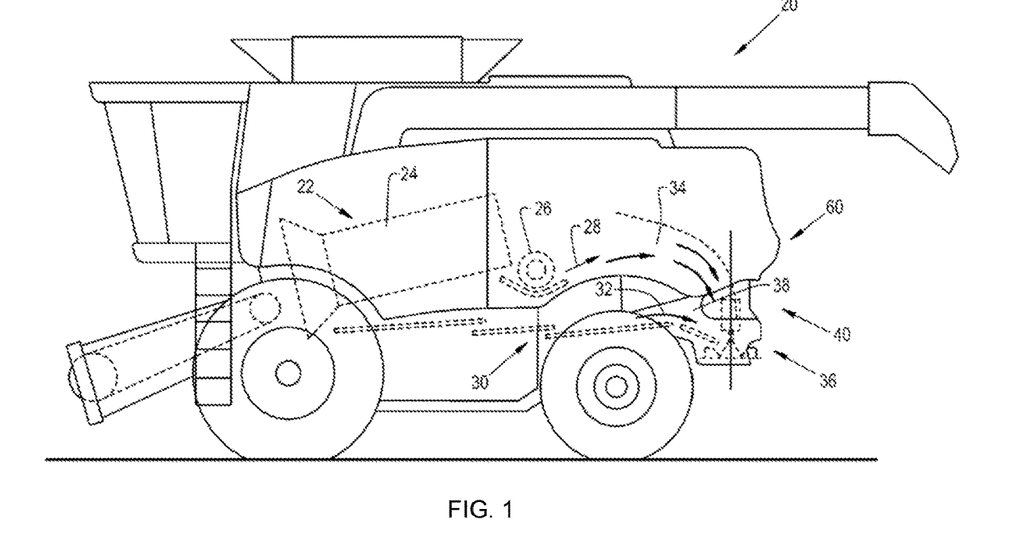
FIG. 1 shows a schematic sideview of an agricultural harvester, indicating a number of key components.

Referring now to the drawings, FIG. 1 shows an agricultural combine 20, which is representative of a wide variety of agricultural harvesting machines. Combine 20 includes a threshing system 22 having a rotor 24 rotatable in known manner for separating the desirable crop component or grain from straw, stocks and other plant residue. A beater 26 is rotatable for propelling or directing a flow or stream of the plant residue, generally referred to as straw 28, toward the rear of combine 20. A cleaning system 30 receives the threshed crop component from threshing system 22 and removes chaff and other remaining residue such as seedpods, husks and the like, generally referred to as chaff 32, and directs a flow or stream of chaff 32 toward the aft end of combine 20. The straw 28 and chaff 32 pass through a cavity 34 toward a horizontal spreader assembly 36 at a lower opening 38 of the cavity 34. The spreader assembly 36 is part of a crop residue spreader system 40 having a spreader rotor and paddles as to be described herein. It should be appreciated that while a horizontal spreader assembly 36 is shown and described herein, the principles of the present invention can also be applied to vertical or angled spreader assemblies.

Figure 2:
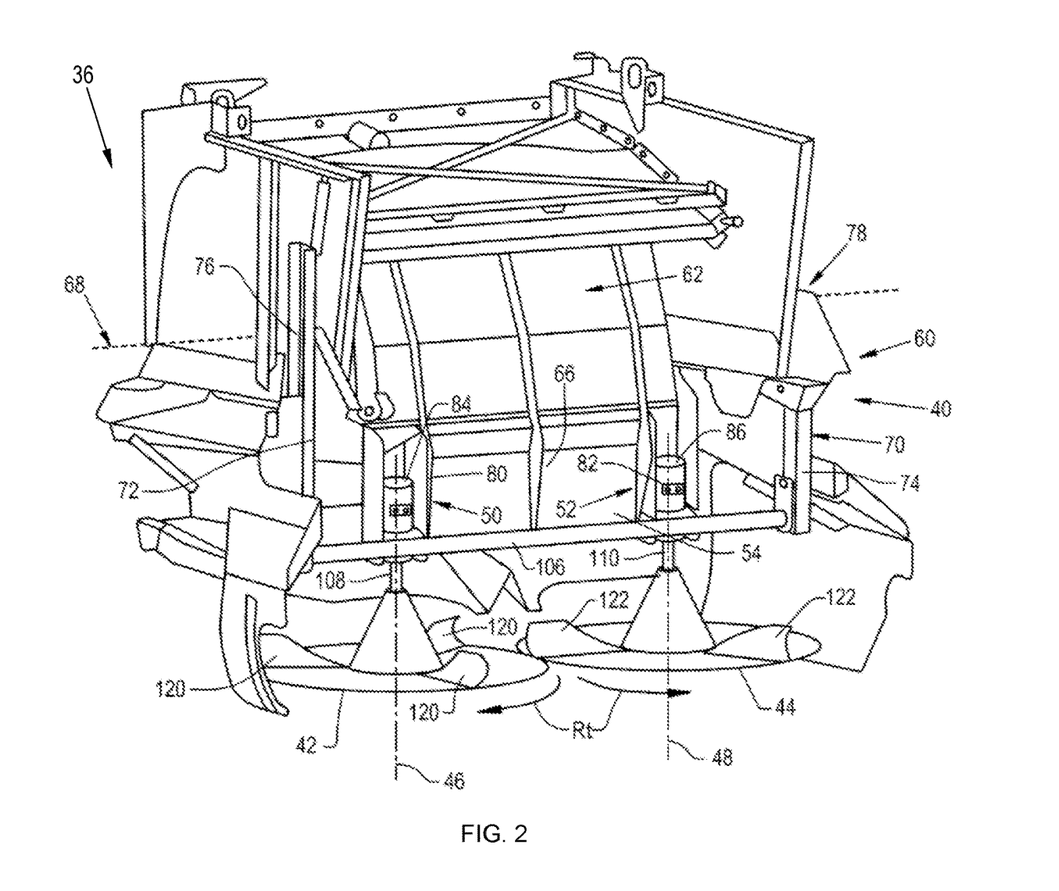
FIG. 2 is a more detailed view of a spreader system of a harvester, as it is presently known in the prior art.

Referring now also to FIG. 2, the spreader assembly 36 of spreader system 40 includes side by side first and second spreader rotors 42, 44 supported for counter rotation as indicated by arrows Rt, about generally upstanding rotational axes 46, 48, respectively. The spreader rotors 42, 44 are supported and driven in rotations Rt by upstanding first and second spreader drive units 50, 52 positioned above the spreader rotors 42, 44, respectively. An open area or space 54 is defined between the laterally positioned spreader drive units 50, 52.

At an aft end 60 of combine 20, crop residue spreader 40 also can include a pivotally supported deflector door 62 configured to adjustably position a lower portion 66 of deflector door 62 in relation to open area 54 defined between drive units 50, 52 of spreader assembly 36. Spreader assembly 36 can be supported for pivotal movement about an axis 68 between a lower, operable position as shown in the drawings for receiving the flows of straw 28 and chaff 32 for spreading thereof over a field, and an upward or stored position (not shown) in which the spreader assembly can be stowed when not in use for spreading. Accordingly, crop residue spreader system 40 further includes a frame 70 and first and second pivot arms 72, 74 movable about first and second pivot points 76, 78, respectively, located on opposite sides of combine 20 along pivot axis 68, the arms 72, 74 also being connected to one another by a cross bar 106.

First and second drive units 50, 52 can include upstanding shields 80, 82 protecting first and second drive motors 84, 86 of drive units 50, 52, respectively. Drive motors 84, 86 are drivingly connected to first and second spreader rotors 42, 44 by first and second drive shafts 108, 110, respectively.

As shown in FIG. 2, each of the counter rotating spreader rotors 42, 44 includes a plurality of structures to receive and engage straw 28 and chaff 32 to forcefully expel the straw 28 and chaff 32 from the crop residue spreader system 40. In FIG. 2, the structures are indicated generically by pluralities of paddles 120, 122. The number and construction of the paddles 120, 122 included in each respective spreader rotor 42, 44 can be varied in many different ways, as is known in the art. For example, the paddles can have a V- or U-shape and/or the end of the paddle facing the deflectors can have a serrated or undulated edge. FIG. 2 shows a spreader assembly that is not provided with deflectors. Deflector assemblies as such are known in the art, including deflector assemblies configured to undergo an oscillating movement, as disclosed for example in WO2018/162680A1. This latter system will be described in some more detail, followed by a description of deflector assemblies in accordance with a number of embodiments of the invention.

Figure 3:
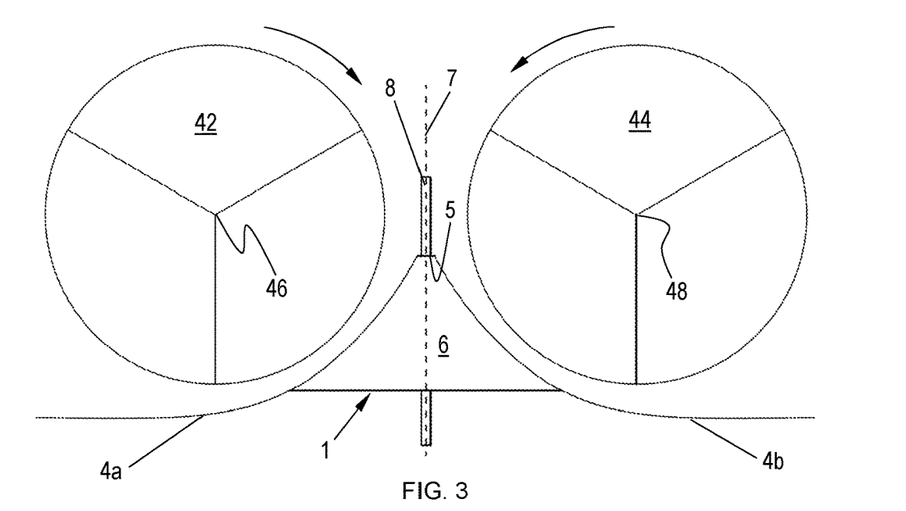
FIG. 3 shows a simplified front and plane view of the spreader rotors and of the deflector in a spreader system according to the prior art, wherein the deflector is configured to oscillate by a rotation about a horizontal axis.

FIG. 3 shows a front and plane view of a simplified image of a spreader system as known from WO2018/162680A1. The spreader rotors 42 and 44 are represented without showing the drive units and without details of the paddles. The direction of rotation of the spreader rotors about their respective rotation axes 46,48 is indicated by respective arrows along the circumference of the spreader rotors. In the vertical direction, the spreader rotors extend between a lower plane 2 and upper plane 3 indicated in the front view. As best seen in the plane view, the deflector 1 comprises two curved deflector blades 4a and 4b, attached to each other by a central connection which may be in the form of a central connection plate 5 or any other equivalent mechanical connection, and arranged to deflect the expelled residue material from the central area between the spreader rotors, towards the periphery on either side of said central area. For strengthening the deflector 1, at least one support bracket 6 is preferably fixed between the convex surfaces of the deflector blades 4a and 4b. The deflector 1 is configured to oscillate by a reciprocating rotation about a horizontal axis 7. To this aim, the deflector 1 is attached to a horizontal axle 8 that is coupled to an actuator (not shown) for driving the oscillation. The oscillating movement reciprocates between the extreme angular positions shown in FIGS. 4a and 4b, at a given oscillation frequency. In the case shown, the angle $\alpha$ indicated in the drawings is about +4.5° and −4.5° in the extreme positions shown respectively in FIGS. 4a and 4b.

In the front view, it is seen that the orthogonal projection of the deflector blades 4a and 4b on the plane of the drawing has a trapezoidal shape. This shape may also be rectangular or otherwise. As described in WO2018/162680A1, the rotational oscillation enables a more even spreading pattern of the crop residue material due to the periodically changing impact of the deflector blades 4a and 4b on the path of the ejected material.

It is seen that in the neutral position of the deflector 1 shown in FIG. 3 (i.e. the position where $\alpha=0$), there is a gap 9 between the lower edge 10 of the deflector blades and the lower plane 2 of the spreader rotors 42 and 44. Through a central portion of this gap 9, crop residue material is ejected by the spreader rotors 42 and 44 without being deflected by the deflector blades 4a and 4b. The gap 9 is deliberately applied, so that not all the residue material is deflected to the periphery. This enables the even distribution of ejected material across the field area extending behind the advancing harvester. Nevertheless, depending on circumstances such as crop humidity, it may be desirable to eject less or more non-deflected crops through this central area. The oscillation as such does not influence the central portion of the gap 9 significantly, as the angular displacement of the blades is smallest in this central portion of the gap.

Figure 4A:
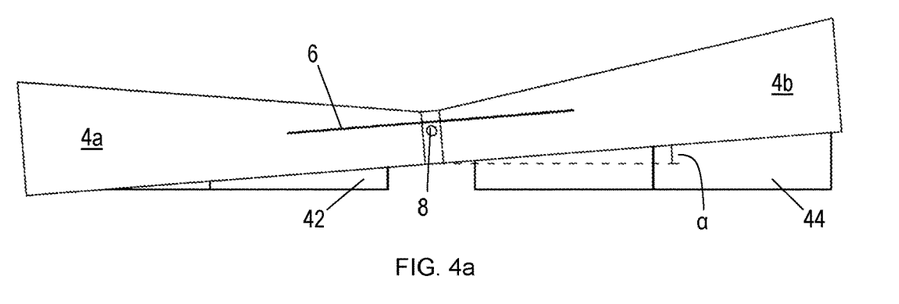
FIGS. 4a and 4b illustrate the extreme positions of the oscillation of the deflector in the prior art system of FIG. 3.
Figure 4B:
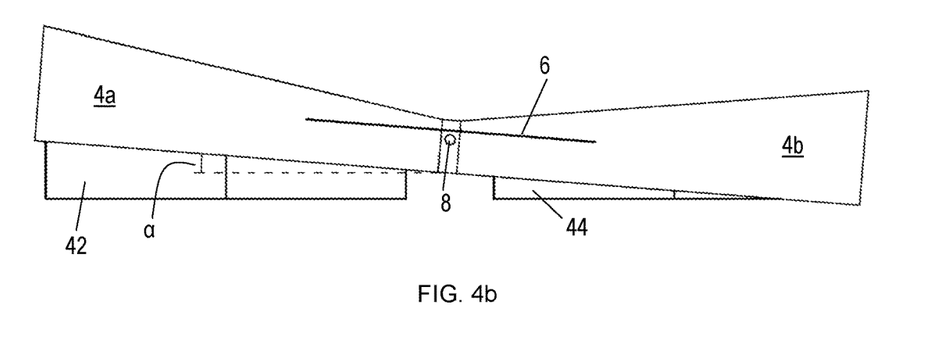

It is seen also that in the case shown, the width of the gap 9 (measured in the vertical direction) appearing in the neutral position is constant across the width (measured in the horizontal direction) of the deflector 1. This is because the orthogonal projection of the lower edge 10 of the deflector blades 4a and 4b on the plane of the front view shown in FIG. 3 is straight and parallel (in the neutral position) to the lower plane 2 of the spreader rotors 42 and 44. Again according to particular circumstances of the crops such as humidity or others, it may be beneficial to apply deflector blades whose lower edge is not parallel to the spreader rotors' lower plane 2 in the neutral position, in order to influence the spreading pattern in a specific way. Such adaptations are not possible with the oscillating deflector shown in FIGS. 3 and 4.

The present invention proposes a spreader system that does allow such adjustments to be made to the deflector. To this aim, a deflector assembly is provided comprising a first structure that is arranged to oscillate, like the main deflector of the prior art system, and two deflector blades which are adjustable to a number of positions which are stationary relative to the first structure, but which oscillate together with said first structure, when adjusted to one of said stationary positions.

Figure 5:
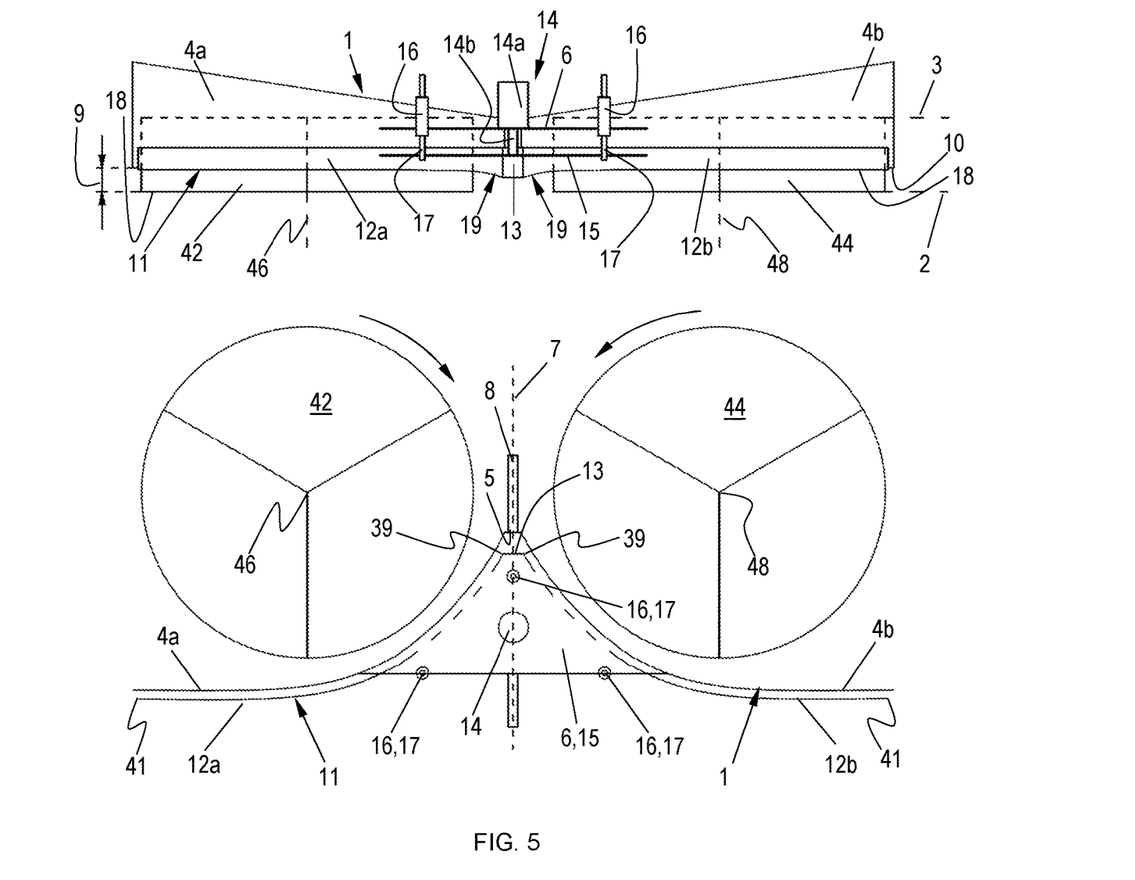
FIG. 5 shows a front and plane view of a spreader system in accordance with a first embodiment of the invention, comprising an adjustable deflector in an upward position.

A first embodiment of a spreader system according to the invention is illustrated in FIGS. 5 to 8. According to this embodiment, the 'first structure' of the deflector assembly is itself a deflector which may be the same as the oscillating deflector 1 of the prior art system. As seen in FIG. 5, this deflector is indicated by the same numeral 1 and will hereafter be referred to as the 'main deflector' 1 of the deflector assembly. Like the prior art deflector, the main deflector 1 comprises two curved deflector blades 4a and 4b, a central connection plate 5 and a support bracket 6. The main deflector 1 is fixed to a horizontal axle 8, configured to oscillate by rotation about a horizontal rotation axis 7. The gap 9 between the lower edge 10 of the main deflector 1 and the lower plane 2 of the spreader rotors, when the main deflector is in the neutral position ($\alpha=0°$) is again indicated.

The deflector assembly further comprises an adjustable deflector 11 comprising two deflector blades 12a and 12b connected by a central plate connection 13. In the embodiment shown, this is a central connection plate, but any other type of mechanical connection is possible. Each of the extendable deflector blades 12a and 12b extends between an inner extremity 39 and an outer extremity 41. The adjustable deflector 11 is configured to oscillate together with the main deflector 1. In the plane view of FIG. 5, it is seen that the adjustable deflector blades 12a and 12b are each respectively parallel to and arranged in close proximity to the deflector blades 4a and 4b of the main deflector 1. The deflector 11 is adjustable in the sense that it can be displaced upwards or downwards by a translation relative to the main deflector 1, while maintaining the parallel configuration visible in the plane view.

Figure 6:
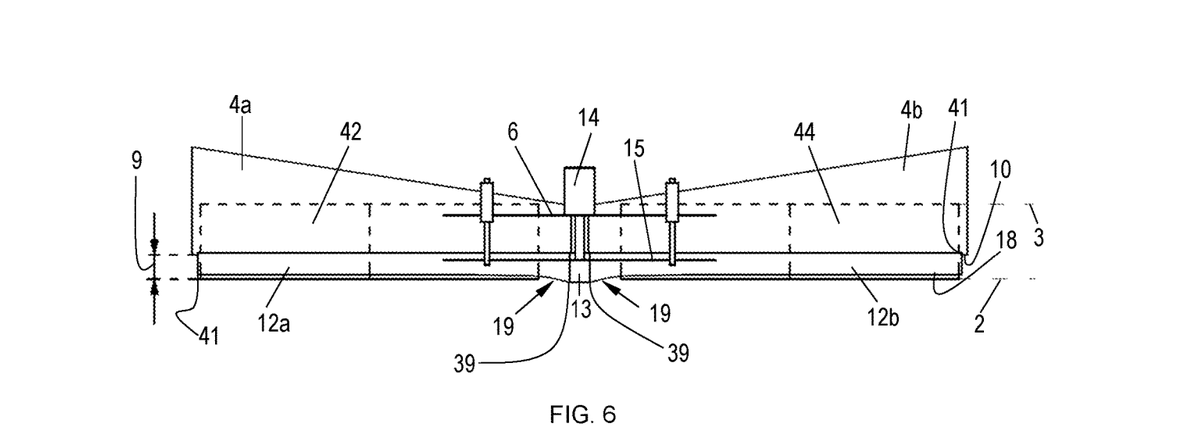
FIG. 6 shows the system of FIG. 5, with the adjustable deflector in a downward position.

In the front view of FIG. 5, the adjustable deflector blades 12a and 12b are in an upward position, almost fully overlapping the main deflector blades 4a and 4b, so that the gap 9 is not or only marginally influenced by the adjustable blades 12a and 12b. In FIG. 6, the system is shown with the adjustable deflector 11 in a downward position, thereby closing off the gap 9 almost completely. Any position between these extremes can be set, to thereby control the width and/or the shape of the gap 9, depending on the shape of the adjustable deflector's lower edge, as will be explained further. However, first one embodiment of the mechanism for adjusting the deflector 11 is described.

With reference to the front and plane views shown in FIG. 5, the base portion 14a of a variable length actuator 14 is mounted on the support bracket 6 that is fixed to the main deflector 1. The adjustable deflector 11 is provided with a similar support bracket 15 fixed to the convex surfaces of the adjustable blades 12a and 12b. The extendable portion 14b of the actuator 14 is attached to the support bracket 15 of the adjustable deflector 11. According to the embodiment shown, guide cylinders 16 are furthermore mounted on the first support bracket 6, and guide pins 17 fixed to the second bracket 15 are slidably inserted in said cylinders 16, for guiding the translational displacement of the adjustable deflector 11 relative to the main deflector 1. However, such guide means may be omitted or other equivalent guide means may be implemented within the scope of the invention.

Figure 7A:
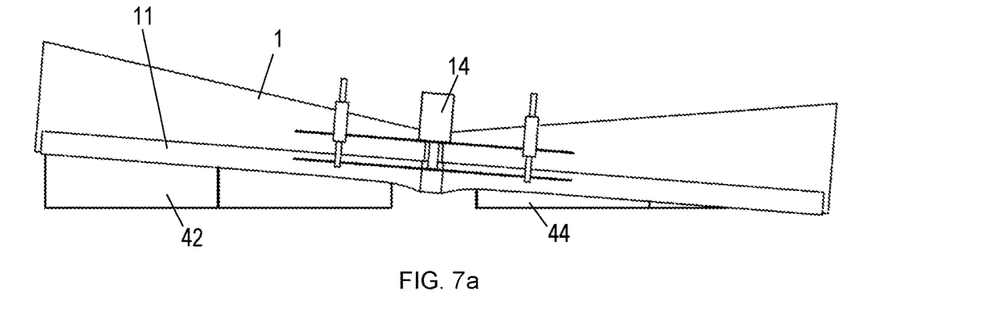
FIGS. 7a and 7b illustrate the extreme positions of the oscillation of the deflector assembly of the system of FIG. 5, with the adjustable deflector in the upward position.
Figure 7B:
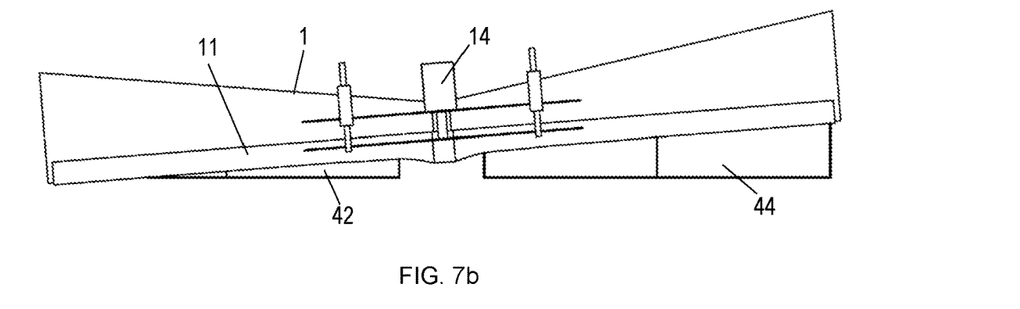
Figure 8A:
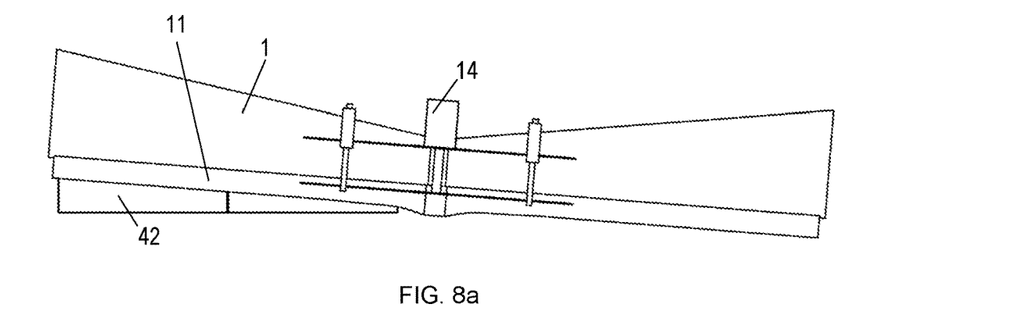
FIGS. 8a and 8b illustrate the extreme positions of the oscillation of the deflector assembly of the system of FIG. 5, with the adjustable deflector in the downward position.
Figure 8B:
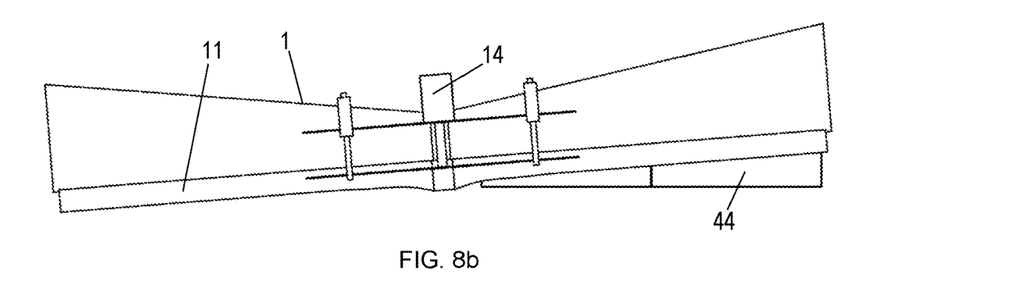

As illustrated in FIGS. 7a and 7b, and in FIGS. 8a and 8b, the rotational oscillation of the assembly of the main and the adjustable deflectors 1 and 11 takes place regardless of the relative position of the deflectors, for example in the extreme upward position of the adjustable deflector 11 (FIGS. 7a/7b) or in the extreme downward position (FIG. 8a/8b), as well as in any other intermediate position. In other words, the two deflectors 1 and 11 are stationary relative to each other and the assembly of the two deflectors 1 and 11 oscillates rotationally about the horizontal axis 7. Displacement of the adjustable deflector 11 from one stationary position to another is however possible during the oscillation.

In the embodiment shown in FIGS. 5 to 8, the lower edge 18 of the adjustable deflector blades 12a and 12b is essentially parallel to the lower edge 10 of the main deflector 1, except in the central area, where the adjustable deflector blades 12a and 12b comprise portions 19 immediately adjacent the inner extremity 39 of the deflector blades, which extend downward relative to the rest of the lower edge of said blades 12a and 12b. Together with the connection plate 13 which also extends downward so as to join the portions 19, the central area of the adjustable deflector 11 thereby essentially closes off the central portion of the gap 9 between the main deflector 1 and the lower plane 2 of the spreader rotors, when the adjustable deflector 11 is extended fully downward (as in FIGS. 6 and 8a/8b).

This particular profile of the lower edge of the adjustable deflector 11 is therefore capable of obstructing the ejection of non-deflected crop residue through the central area of the gap 9 by fully lowering the adjustable deflector. By adjusting the deflector 11 to an intermediate position between the fully upward and fully downward position, the amount of centrally ejected residue material can be controlled, for example as a function of the humidity of the material, as determined by a humidity sensor.

Figure 9A:
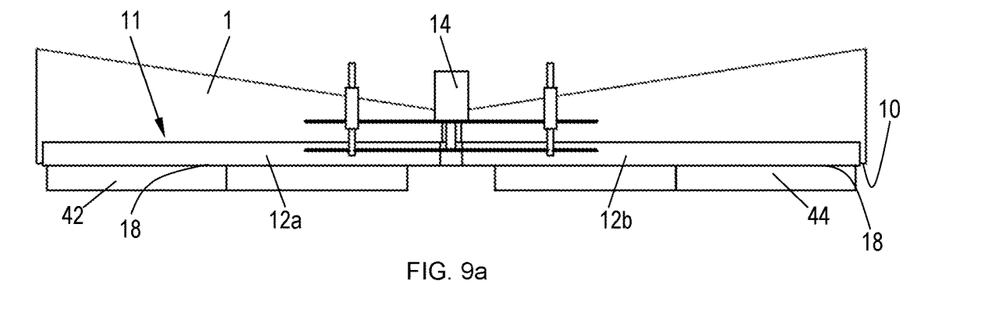
FIGS. 9a to 9d illustrate alternative shapes of the lower edge of the adjustable deflector in the system of FIG. 5.
Figure 9B:
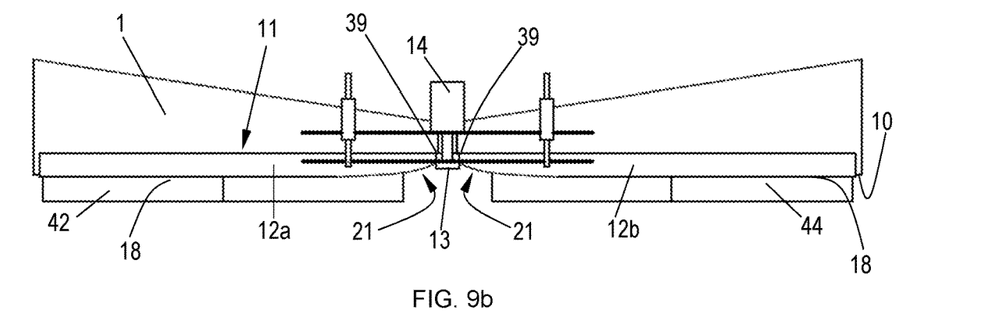
Figure 9C:
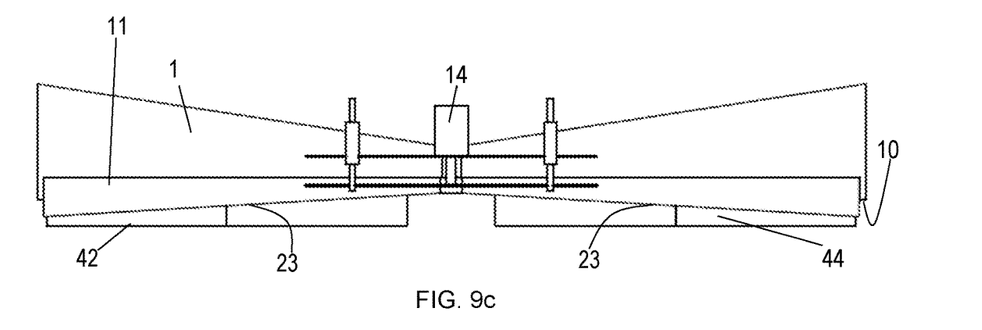
Figure 9D:
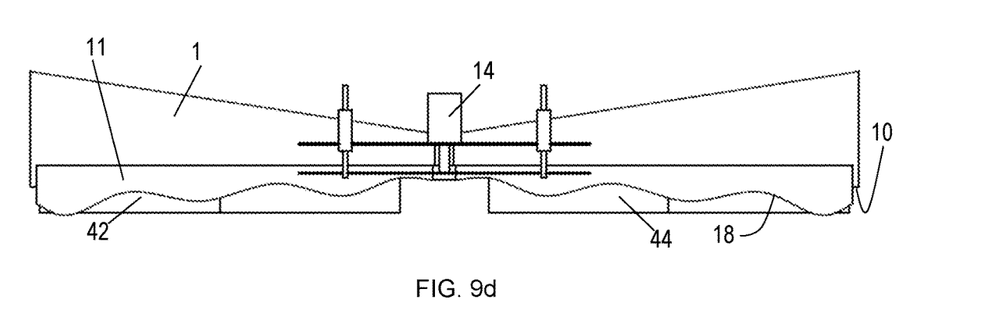

The invention is not limited however to this particular profile of the adjustable deflector's lower edge. Other examples of possible profiles are shown in FIGS. 9a to 9d, each drawing showing the adjustable deflector 11 in the fully upward position and in the neutral position of the oscillation. The plane view of each of these configurations is the same as the plane view shown in FIG. 5. In FIG. 9a, the lower edge 18 of the adjustable blades 12a and 12b is fully parallel to the lower edge 10 of the main deflector 1, so that the central area of the gap 9 may be controlled but never completely closed off. In FIG. 9b, the lower edge 18 of the adjustable deflector blades 12a and 12b comprises portions 21 extending upward relative to the rest of the lower edge 18 and located immediately adjacent the inner extremity 39 of the blades. This profile realises the opposite of the profile of FIGS. 5 to 8: a central area of the gap 9 is now always open regardless of the position of the adjustable deflector 11, and said position of the adjustable deflector 11 influences only the width of the gap 9 outside this central area. In FIG. 9c, a profile is illustrated wherein the orthogonal projection of the lower edge of the adjustable deflector blades on the plane of the drawing forms oppositely inclined lines 23 oriented at a non-zero angle to the main deflector's lower edge 10. In the embodiment shown in FIG. 9d, the profile of the lower edge 18 of the adjustable deflector blades exhibits a wave shape. Other shapes of the adjustable deflector's lower edge 18 can be imagined, which all fall within the scope of the invention. Shapes like the ones shown in FIGS. 9c and 9d may be configured for imparting specific spreading forces to the ejected and deflected crop, when the deflector assembly is oscillated about the central axis 7, to thereby influence the spreading pattern in a specific way. Such and other shapes might also be helpful to prevent clogging or blocking of the residue spreading system, by allowing bigger chunks of residue to pass.

In the embodiment of FIGS. 5-9, the outer extremities 41 of the adjustable blades 12a and 12b are almost coinciding with the extremities of the main deflector blades 4a and 4b, i.e. the adjustable blades 12a and 12b are almost as long as the main deflector blades 4a and 4b. According to other embodiments, the adjustable deflector blades may be shorter than the main deflector blades 4a and 4b, i.e. starting from the inner extremities 39 and extending outward to outer extremities lying for example at ⅔ of the length of the main deflector blades 4a and 4b, whilst remaining parallel to said main deflector blades. The adjustable deflector blades could also be longer than the main deflector blades 4a and 4b.

Figure 10:
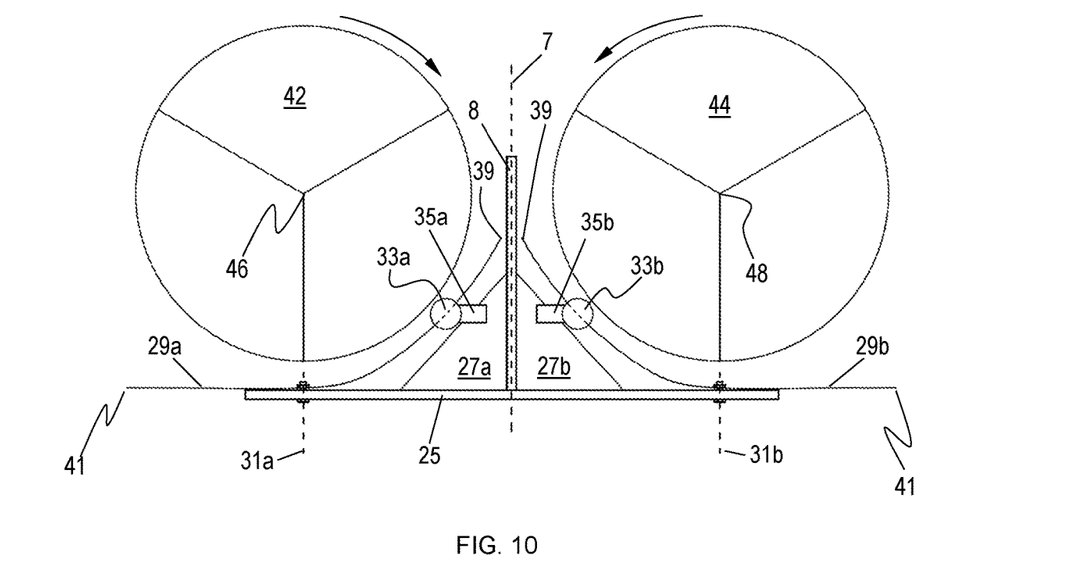
FIG. 10 shows a front and plane view of a spreader system in accordance with a second embodiment, comprising two deflector blades whose angular position relative to an oscillating frame can be adjusted.

Another embodiment according to the invention is illustrated in FIG. 10. According to this embodiment, the spreader system comprises again the two spreader rotors 42 and 44, and a deflector assembly. The assembly comprises a frame 100 that is fixed to a horizontal axle 8, configured to oscillate by rotation about rotation axis 7 between extreme positions in the same manner as described above (i.e. the frame 100 oscillates). The frame 100 comprises a support element 25, for example a beam structure, that is fixed at a central location to the axle 8, and preferably a pair of support brackets 27a and 27b for strengthening the frame. The assembly further comprises two adjustable deflector blades 29a and 29b extending between inner and outer extremities 39 and 41, which are not fixed to each other, but which are each pivotably coupled to the support element 25, being pivotable about respective horizontal axes 31a and 31b oriented parallel to the direction tangential to the spreader rotors in which the crop is ejected. The front view of FIG. 10 shows the blades 29a and 29b in the neutral position, in which their lower edge 18 is parallel to the lower plane 2 of the spreader rotors. Analogous to the first embodiment, this neutral position of the blades leaves a gap 9 of constant width between the lower edge 18 of the blades and the lower plane 2 of the spreader rotors 42 and 44.

The angular position of the blades 29a and 29b relative to the support element 25, as seen in an orthogonal projection on the plane of the front view shown in FIG. 10, is adjustable. In the embodiment shown, this is realised by a pair of variable length actuators 33a and 33b. The base portions of the actuators are attached via respective support mounts 35a and 35b to the frame 100, in this case the support mounts 35a and 35b are respectively fixed to the support brackets 27a and 27b. The extendable portions of the actuators 33a and 33b are rotatably attached to the adjustable deflector blades 29a and 29b in respective pivot points 37a and 37b.

Figure 11:
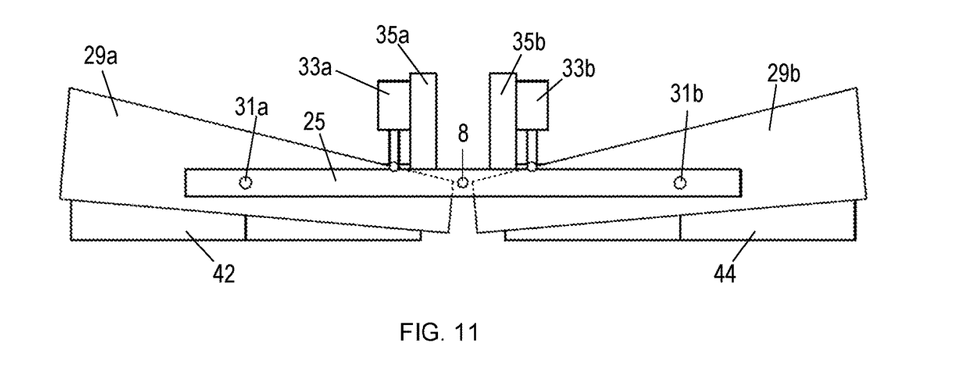
FIG. 11 shows the system of FIG. 10, with the adjustable deflector blades in a tilted position.
Figure 12A:
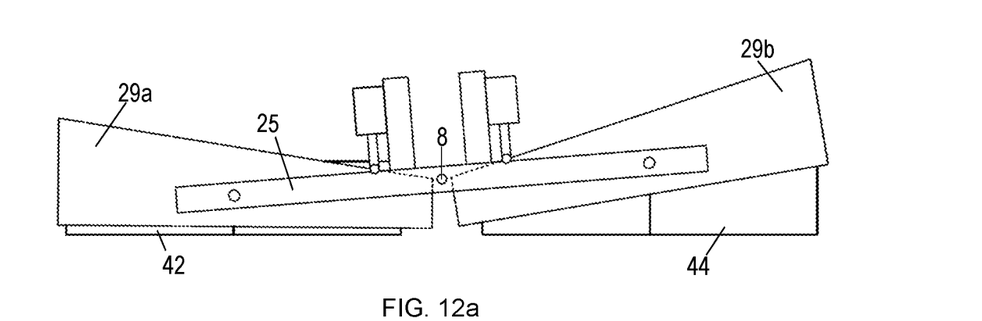
FIGS. 12a and 12b illustrate the extreme positions of the oscillation of the deflector assembly of the system of FIG. 10, with the adjustable deflector blades in the tilted position of FIG. 11.
Figure 12B:
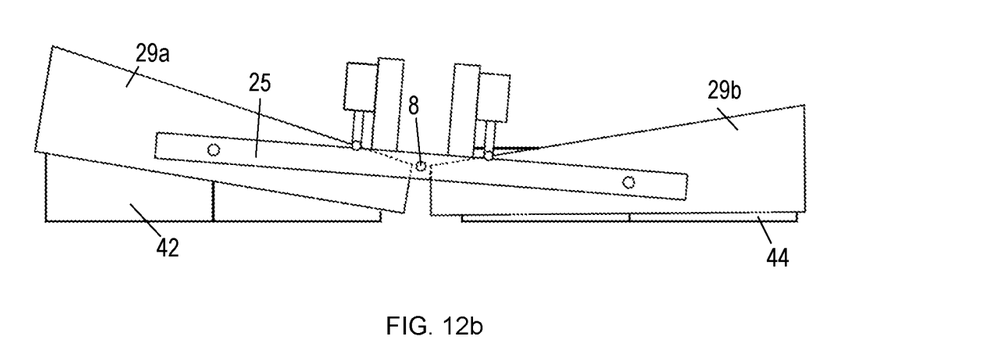
Figure 13:
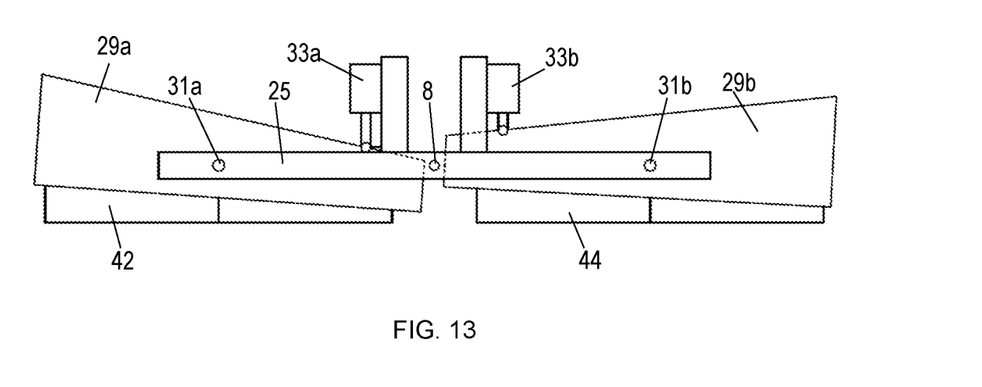
FIG. 13 illustrates another tilted position of the deflector blades of the system shown in FIG. 10.

This configuration thereby enables setting the angular positions of the blades 29a and 29b to any number of stationary positions relative to the oscillating frame 100 within a given angular range. For example, as illustrated in FIG. 11, by extending the actuators 33a and 33b downward by the same length, the blades 29a and 29b may be tilted downward by about 5° toward the axle 8, thereby at least partially closing off the central area of the gap 9 between the blades 29a and 29b and the lower plane 2 of the spreader rotors. FIGS. 12a and 12b illustrate the extreme positions of the oscillation of the complete assembly, with the blades 29a and 29b in this tilted position relative to the frame. Any other relative position of the blades can be set, enabling the control of the spreading pattern on one side independently form the other side. For example, FIG. 13 illustrates a position wherein the blades 29a and 29b are tilted at opposite angles.

The mechanical system for setting the tilt angle of the blades 29a and 29b is not limited to the system shown, i.e. two separate actuators 33a and 33b arranged to set the angles independently one from the other. Other mechanical systems are within the scope of the invention, including for example a system comprising only one actuator that sets the angular position of the blades simultaneously to positions which are not independent from each other, through one or more linkages mounted between the movable portion of the actuator and one or more pivot points coupled to the deflector blades 29a and 29b.

In any one of the above-described embodiments, the control of the adjustment can be based on the output of one or more sensors mounted on the harvester. This may be a humidity sensor for example, one or more radar sensors configured to observe the spreading pattern behind the harvester, a crop intake flow rate sensor or a rotational speed/torque sensor on a spreader rotor. The harvester may comprise a control unit configured to receive input signals from the one or more sensors and/or machine parameters of the combine, for example the combine forward speed, and to send out control signals to the actuating mechanism arranged for setting the position of the adjustable deflector blades, such as the actuator 14 or the pair of actuators 33a and 33b, for changing the position of the adjustable blades as a function of the received input signals, in accordance with a suitable control algorithm. For example, when the crop residue is wet, it is better to eject more material without deflecting the material. Hence, when the system shown in FIGS. 5 to 8 is used, the detection of increased humidity would be an indicator for raising the adjustable deflector 11, so that the width of the gap 9 in the central area is increased. Instead of an automatic control system, the adjustment may also be set manually by the operator of the harvester, on the basis of input from a number of sensors received on a screen in the harvester's cabin.

The invention is not limited to a deflector assembly configured to oscillate by rotation about an essentially horizontal axis 7. Adjustable deflector blades in accordance with the invention can be combined with other types of oscillation, for example a translational oscillation of the main deflector 1 or of the frame 100 wherein said structures as a whole undergo a reciprocating upward and downward movement between an upper and lower extreme position.

According to an embodiment, the spreader system is configured so that the oscillation of the 'first structure' of the deflector assembly (e.g. the main deflector 1 or the frame 100), is adapted as a function of the position of the adjustable deflector blades (e.g. the blades 12a,12b of deflector 11 or the adjustable blades 29a,29b). The oscillation can be adapted in terms of its frequency or amplitude, for example by increasing the frequency when the adjustable blades are in a given position.

According to an embodiment, a spreader system of the invention may be activated when the harvester is not in operation. For example using the system of FIG. 5, a given sequence may be applied, wherein the spreader rotors are activated without crop residue being supplied thereto, while the main deflector 1 is oscillated a number of times, and while the adjustable deflector 11 is moved up and down a number of times relative to the main deflector 1. Such a sequence may be applied as part of a cleaning operation, for removing an amount of crop residue material that has remained in the spreader system after a harvesting run.

The invention claimed is:

1. A spreader system for use in a self-propelled agricultural harvester for spreading crop residue in an area behind the harvester, the system comprising:
   a pair of spreader rotors configured to rotate about upright rotation axes so as to eject crop residue in a central area between the spreader rotors, and in a direction that is tangential to the spreader rotors, wherein the spreader rotors extend in a direction of the rotation axes between a lower plane and an upper plane; and
   a deflector assembly for deflecting ejected crop residue laterally away from the central area, the deflector assembly comprising:
      a first structure configured to oscillate by undergoing a reciprocating motion relative to a neutral position, wherein the first structure is a main deflector comprising two main deflector blades fixed to each other by a connection in the central area between the spreader rotors, and
      two adjustable deflector blades arranged to deflect residue material ejected respectively by the two spreader rotors, each of the adjustable deflector blades having an at least partially curved shape extending between an inner extremity in the central area between the spreader rotors and an outer extremity in a lateral area, wherein the adjustable deflector blades are coupled to the first structure in such a way that:
         the adjustable deflector blades oscillate together with the first structure; and
         in the neutral position of the first structure, the adjustable deflector blades are movable in a direction that is parallel to the upright rotation axes to any one of a plurality of stationary positions relative to the two main deflector blades of the first structure.

2. The spreader system according to claim 1, wherein the reciprocating motion is a reciprocating rotation about an axis oriented in a direction that is tangential to the spreader rotors, and located between the rotation axes of the spreader rotors.

3. The spreader system according to claim 1, wherein the first structure is a frame comprising a support element oriented transversely with respect to the rotation axes of the spreader rotors, and wherein the adjustable deflector blades are pivotably coupled to the support element, and configured so that their angular positions relative to the support element and about respective pivot axes oriented parallel to a direction that is tangential to the spreader rotors, are adjustable.

4. The spreader system according to claim 3, further comprising a first variable length actuator and a second variable length actuator, each comprising a base portion and an extendable portion, and wherein the base portions are fixed to the frame, and the extendable portions are rotatably coupled respectively to the adjustable deflector blades, at positions that enable setting of the angular position by extending or retracting the extendable portions of the first and second variable length actuators.

5. The spreader system according to claim 3, further comprising a single variable length actuator having a base portion fixed to the frame and an extendable portion coupled to a linkage system that is itself coupled to the adjustable deflector blades in such a way that extending or retracting the extendable portion of the actuator adjusts the angular position of the adjustable deflector blades.

6. A self-propelled agricultural harvester comprising a spreader system according to claim 1.

7. The harvester according to claim 6, further comprising one or more sensors and a control unit configured to:
 receive input signals from the one or more sensors and machine parameters of the harvester, and
 send out control signals to the spreader system, for adjusting a position of the adjustable deflector blades as a function of the received input signals.

8. The harvester according to claim 7, wherein the sensors include one or more of the following: a sensor for measuring humidity of harvested crops or of the crop residue, a crop intake flow rate sensor, a rotational speed or torque sensor on the spreader rotors, and a radar sensor configured to detect a spreading pattern of crop residue ejected from the spreader system.

9. The harvester according to claim 6, further comprising manual controls configured to enable an operator of the harvester to manually set a position of the adjustable deflector blades.

10. The spreader system according to claim 1, wherein the two main deflector blades are at least partially surrounded by the two adjustable deflector blades.

11. A spreader system for use in a self-propelled agricultural harvester for spreading crop residue in an area behind the harvester, the system comprising:
 a pair of spreader rotors configured to rotate about upright rotation axes so as to eject crop residue in a central area between the spreader rotors, and in a direction that is tangential to the spreader rotors, wherein the spreader rotors extend in a direction of the rotation axes between a lower plane and an upper plane; and
 a deflector assembly for deflecting ejected crop residue laterally away from the central area, the deflector assembly comprising:
  a first structure configured to oscillate by undergoing a reciprocating motion relative to a neutral position, and
  two adjustable deflector blades arranged to deflect residue material ejected respectively by the two spreader rotors, each of the adjustable deflector blades having an at least partially curved shape extending between an inner extremity in the central area between the spreader rotors and an outer extremity in a lateral area, wherein the adjustable deflector blades are coupled to the first structure in such a way that:
   the adjustable deflector blades oscillate together with the first structure; and
   the adjustable deflector blades are movable to any one of a plurality of stationary positions relative to the first structure,
 wherein the first structure is a main deflector comprising two main deflector blades fixed to each other by a connection in the central area between the spreader rotors, the main deflector having a lower edge formed by lower edges of the main deflector blades and of the central connection, and wherein a gap is present between the lower edge of the main deflector and the lower plane of the spreader rotors, when the main deflector is in the neutral position, and
 the adjustable deflector blades are parallel to and arranged in close proximity to the main deflector blades of the main deflector and are configured so as to be extendable downward and retractable upwards relative to the main deflector while overlapping the main deflector blades of the main deflector, so as to adjust a width or a shape of the gap.

12. The spreader system according to claim 11, wherein the adjustable deflector blades are fixed to each other by a central connection, the adjustable deflector blades and the central connection forming together an adjustable deflector.

13. The spreader system according to claim 12, further comprising a variable length actuator comprising a base portion and an extendable portion, wherein the base portion is coupled to the main deflector and the adjustable portion is coupled to the adjustable deflector.

14. The spreader system according to claim 11, wherein a lower edge of the adjustable deflector blades is not parallel to the lower edge of the main deflector.

15. The spreader system according to claim 14, wherein the lower edge of each of the adjustable deflector blades comprises a portion extending downward relative to the rest of the lower edge, the downward extending portions being located immediately adjacent the inner extremities of the adjustable deflector blades.

16. The spreader system according to claim 14, wherein the lower edge of each of the adjustable blades comprises a portion extending upward relative to the rest of the lower edge, the upward extending portions being located immediately adjacent the inner extremities of the adjustable deflector blades.

* * * * *